(12) United States Patent  
Terao (10) Patent No.: US 7,039,097 B2  
(45) Date of Patent: May 2, 2006

(54) CDMA RECEIVER, PATH SEARCH METHOD AND PROGRAM

(75) Inventor: Kenji Terao, Tokyo (JP)

(73) Assignee: NEC Corporation, Tokyo (JP)

( * ) Notice: Subject to any disclaimer, the term of this patent is extended or adjusted under 35 U.S.C. 154(b) by 783 days.

(21) Appl. No.: 10/214,703

(22) Filed: Aug. 9, 2002

(65) Prior Publication Data

US 2003/0039304 A1    Feb. 27, 2003

(30) Foreign Application Priority Data

Aug. 22, 2001   (JP) .............................. 2001-251753

(51) Int. Cl.
*H04B 1/69*   (2006.01)
*H04B 1/707*   (2006.01)

(52) U.S. Cl. ...................... 375/148; 375/147; 375/150; 370/342

(58) Field of Classification Search ................ 375/147, 375/148, 150; 370/342
See application file for complete search history.

(56) References Cited

U.S. PATENT DOCUMENTS

| | | | | |
|---|---|---|---|---|
| 6,768,729 | B1 * | 7/2004 | Ohsuge ...................... | 370/342 |
| 2001/0033609 | A1 * | 10/2001 | Tamura et al. ............... | 375/150 |
| 2002/0003791 | A1 * | 1/2002 | Hayata ....................... | 370/342 |
| 2003/0026233 | A1 * | 2/2003 | Ohsuge ...................... | 370/342 |

FOREIGN PATENT DOCUMENTS

| | | |
|---|---|---|
| EP | 0 924 868 A1 | 6/1999 |
| EP | 0 989 685 A2 | 3/2000 |

OTHER PUBLICATIONS

B. N. Vejlgaard et al., "Grouped Rake Finger Management Principle for Wideband CDMA," 2000 IEEE 51st, Vehicular Technology Conference Proceedings, May 15-18, 2000, XP00979585, pp. 87-91.

* cited by examiner

*Primary Examiner*—Mohammed Ghayour
*Assistant Examiner*—L. Malek
(74) *Attorney, Agent, or Firm*—Foley & Lardner LLP (57) ABSTRACT

To perform path search processing by means of a smaller amount of calculation and less power consumption, region index calculator 29 decides, for each region resulting from subdividing the delay profile measurement range, whether or not it is a region in which there is a peak, and supplies the results of these decisions as index information. On the basis of this index information, region designation calculator 27 outputs information indicative of whether or not a given region is a region in which a path is present. On the basis of the information from region designation calculator 27, data classifier 24 classifies data, after analogue-to-digital conversion, into data of regions in which there is a path and data of regions in which there is no path. Data integrator 25 integrates the data of the plurality of regions in which no path is present, making it into data of a single imaginary region, and data combiner 26 combines the data of the regions integrated by data integrator 25, with the data of the regions in which there is a path. Delay profile measuring unit 33 forms a delay profile by calculating the correlation power of the combined data at each of a plurality of delays.

8 Claims, 7 Drawing Sheets

CDMA RECEIVER, PATH SEARCH METHOD AND PROGRAM

BACKGROUND OF THE INVENTION

1. Field of the Invention

The present invention relates to a CDMA receiver, and in particular to a method of searching for paths by calculating the delay profile at prescribed intervals, this delay profile showing the power distribution of the received signal as a function of delay.

2. Description of Related Art

In mobile communications, the spread in the propagation path lengths of the signal received in a multipath environment means that there are multiple waves having different propagation delays. A feature of direct sequence code division multiple access (DS-CDMA) is that it is capable of separating and extracting these multiple waves in the form of a so-called "delay profile", by using a wide-bandwidth spreading code to spread the narrowband data. It is well known that in DS-CDMA communications a diversity effect can be obtained and receiving characteristics improved by rake combining this plurality of multipath signals with different propagation delays. More specifically, a DS-CDMA receiver employs a multipath searcher to measure the delay profile (the distribution of signal power as a function of delay); selects several paths within the measurement range that have a high signal power; allocates these paths to respective fingers; and combines the selected paths in a rake combining receiver.

However, because the relative position of a mobile station changes relative to a base station, the radio wave transmission environment around the mobile station varies and hence the delay profile also changes. For this reason, the delay profile measured by the multipath searcher also varies, which results in variation in the delay associated with a path to be rake combined. Hence in a mobile communications environment it is necessary to follow these changes in the delay profile and to perform rake combining in such a way that maximum signal power is obtained.

In order to follow these delay profile changes described above, the path search method employed by a CDMA receiver to search for a path from the delay profile has hitherto had a multipath search function for detecting a path from the delay profile, plus a tracking function for tracking the provisionally detected path.

The delay profile is formed by calculating the correlation power at each of a plurality of delays by obtaining the correlation between the received data and the spreading code. However, because there is generally a large amount of data and always a considerable amount of calculation required to obtain this correlation, a conventional path search method that performs the same correlation computation for all timings within the delay profile measurement range has inevitably taken considerable time to perform the processing required to detect paths from the delay profile, and its implementation has been associated with high power consumption.

A problem encountered with the conventional CDMA receiver described above is that because an enormous amount of computation is required in the path search processing for discovering valid paths from a delay profile that has been obtained, both the amount of calculation and the power consumption are large.

SUMMARY OF THE INVENTION

It is an object of the present invention to provide a CDMA receiver and a path search method capable of performing, with a smaller amount of calculation and power consumption, the path search processing for discovering valid paths from a delay profile that has been obtained.

To achieve the object described above, a CDMA receiver according to the present invention is a CDMA receiver that periodically performs a path search on A/D converted digital data after forming a delay profile by calculating the correlation power at each of a plurality of delays; said CDMA receiver comprising:

path search means for performing a path search on the basis of the previously calculated delay profile, splitting the delay profile measurement range into a plurality of regions, and discriminating between regions in which a path is present and regions in which a path is not present;

data classifying means for classifying said A/D converted digital data into data of regions in which a path is present and data of regions in which a path is not present, on the basis of information from said path search means;

a data integrator for integrating the data of the plurality of regions that have been classified by said data classifying means as regions in which a path is not present, whereby the integrated data is regarded as the data of a single imaginary region;

data combining means for combining the region data that has been integrated by said data integrator, with the data of regions that have been classified by said data classifying means as regions in which a path is present; and delay profile measuring means for creating a delay profile for the data after it has been combined by said data combining means, by calculating the correlation power at each of a plurality of delays.

This invention is designed to split the delay profile measurement range into a plurality of regions; to classify the split regions into those in which a path is present and those in which a path is not present; and to calculate the delay profile by calculating, in the case of the data of regions in which a path is present, the correlation power in each region; and, in the case of the data of regions in which a path is not present, calculating the correlation power after these data have been integrated as the data of a single imaginary region. Accordingly, this invention facilitates a reduction in the amount of data required to obtain the correlation power, and enables path search processing, for discovering valid paths from a delay profile that has been obtained, to be carried out with a smaller amount of calculation and power consumption.

Another CDMA receiver according to the present invention is a CDMA receiver that periodically performs a path search on A/D converted digital data after forming a delay profile by calculating the correlation power at each of a plurality of delays; said CDMA receiver comprising:

path search means for performing a path search on the basis of the previously calculated delay profile, splitting the delay profile measurement range into a plurality of regions, and discriminating between regions in which a path is present and regions in which a path is not present;

combined correlation code generation means for generating and outputting, for regions in which a path is present, a conventional correlation code, and for generating and outputting, for regions in which a path is not present, a correlation code that has been combined on the basis of the delay differences among these plurality of regions in which a path is not present;

delay profile measuring means for creating a delay profile for said A/D converted digital data by calculating the correlation power at each of a plurality of delays, using the correlation codes generated by said combined correlation code generation means; and operation timing generation means which, if there were, in the previously calculated delay profile and among the regions resulting from splitting the delay profile measurement range, a plurality of regions in which a path was not present, discontinues the correlation calculation of the delay profile measuring means in regions other than a region selected from among the plurality of regions in which a path was not present.

This invention is designed to split the delay profile measurement range into a plurality of regions; to classify the split regions into those in which a path is present and those in which a path is not present; and to calculate the delay profile in the case of data of regions in which a path is present, by using a conventional correlation code to calculate the correlation power in each region; and, in the case of regions in which a path is not present, by using a correlation code that has been combined on the basis of the delay differences among these plurality of regions in which a path is not present, to calculate the correlation power, finding, by means of a single correlation power calculation, the value obtained by integrating the correlation powers of the plurality of regions in which a path is not present. Accordingly, because this invention facilitates a reduction in the amount of computation required to calculate the correlation power, it enables path search processing, for discovering valid paths from a delay profile that has been obtained, to be carried out with a smaller amount of calculation and power consumption.

In this invention, the path search means can also comprise:

peak position detection means for detecting the peak positions in the delay profile calculated by said delay profile measuring means, and for detecting the correlation power at said peak positions;

region index calculating means for deciding, on the basis of the peak information detected by said peak position detection means, and from the sum of the peak powers contained in each region resulting from splitting the delay profile measurement range, whether each said region is a region in which a peak is present, or is a region in which a peak is not present; and for calculating index information indicative of the result of said decision; and region designation calculating means for outputting, on the basis of the index information obtained by said region index calculating means, information indicative of whether a given region is a region in which a path is present, or whether it is a region in which a path is not present.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

The functional block that calculates the delay profile generally has to cope with a large amount of computation and high power consumption. However, when there is little change in the paths and correlation peaks, it is assumed that a region in which there is no significant path will not have a path in the following sampling period either. Accordingly, the CDMA receiver of this first embodiment splits the delay profile measurement range into a plurality of regions and, before calculating the delay profile, integrates the plurality of regions in which a path (i.e., a correlation peak) was not present in the previous sampling period. This reduces the amount of computation required to calculate the delay profile, thereby decreasing the amount of processing and the power consumption.

Figure 1:
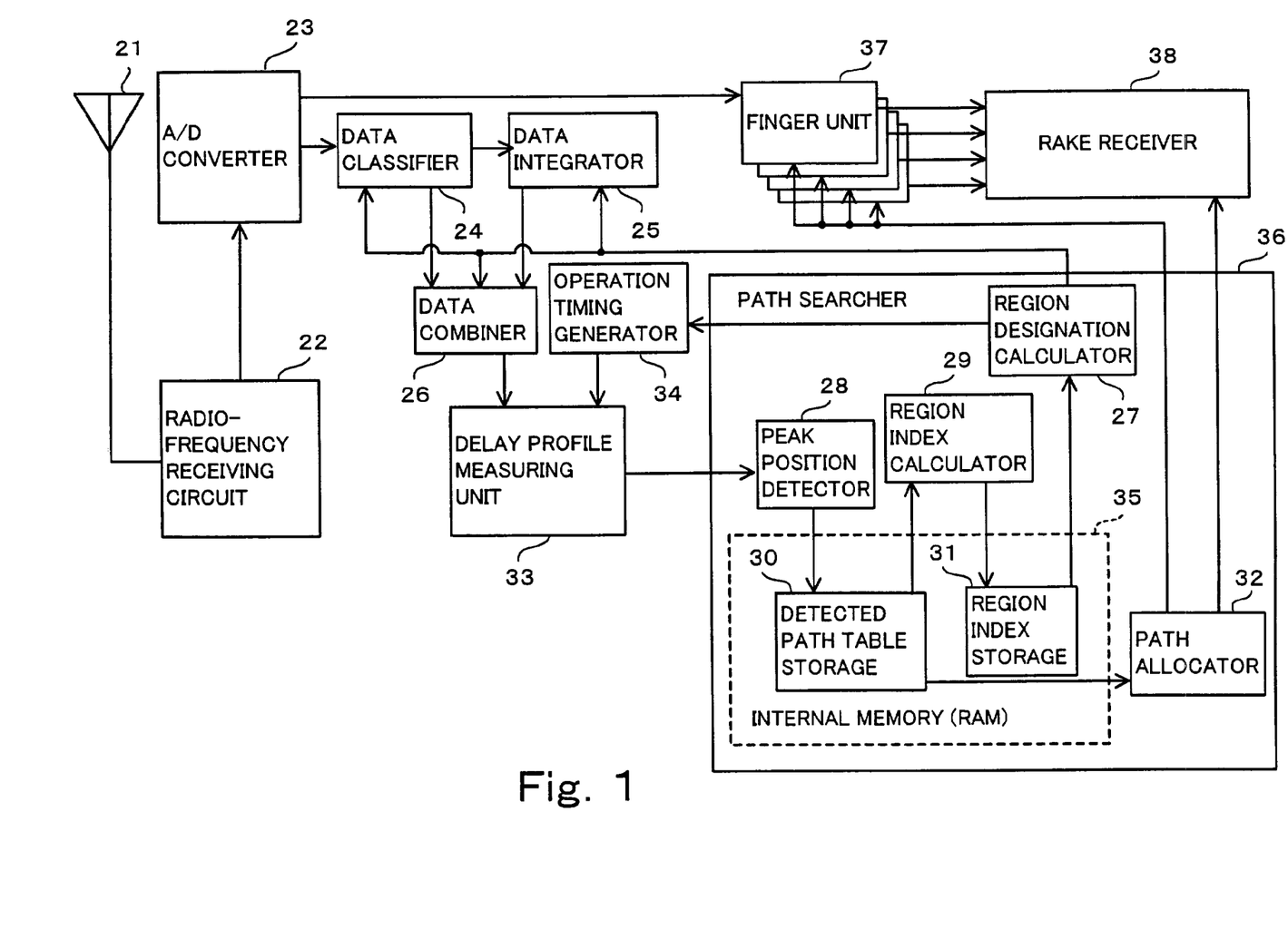
FIG. 1 is a block diagram showing the constitution of a CDMA receiver according to a first embodiment of the invention.

FIG. 1 gives a block diagram showing the constitution of the CDMA receiver according to this first embodiment of the invention. As shown in FIG. 1, a CDMA receiver according to this first embodiment comprises antenna 21, radio-frequency receiving circuit 22, A/D converter 23, data classifier 24, data integrator 25, data combiner 26, delay profile measuring unit 33, operation timing generator 34, path searcher 36, finger unit 37 and rake receiver 38.

Path searcher 36 comprises region designation calculator 27, peak position detector 28, region index calculator 29, path allocator 32 and internal memory (RAM) 35. Internal memory 35 comprises detected path table storage 30 and region index storage 31.

High-frequency receiving circuit 22 demodulates the radio signal input from antenna 21. A/D converter 23 performs analogue-to-digital conversion of the signal demodulated by radio-frequency receiving circuit 22, thereby generating digital data.

Data classifier 24 performs processing for classifying the digital data from A/D converter 23 into regions in which a path is present and regions in which no path is present, on the basis of information from region designation calculator 27. Data integrator 25 performs processing for integrating the data of the plurality of regions classified by data classifier 24 as regions in which no path is present, whereby the integrated data is regarded as the data of a single imaginary region.

Data combiner 26 performs processing for combining the data of the regions that have been integrated by data integrator 25, with the data of the regions that have been classified by data classifier 24 as regions in which a path is present. In this first embodiment, data combiner 26 combines the data by adding the data of the regions integrated by data integrator 25 to the end of the data of the regions classified as regions in which a path is present.

Delay profile measuring unit 33 periodically, with timings generated by operation timing generator 34, calculates the delay profile of the digital data that have been combined by data combiner 26. It obtains the delay profile by operating a correlator at time intervals that have been set as the delay resolution, thereby despreading the digital data and calculating power as a function of delay.

Operation timing generator 34 indicates, to delay profile measuring unit 33, timings that correspond to the length of the region over which the delay profile is to be calculated. This is because the length of this region varies.

Path searcher 36 performs a path search on the basis of the delay profile calculated by delay profile measuring unit 33; indicates to rake receiver 38 the timings at which paths are present; and, when the delay profile has been split into a plurality of regions, outputs to data classifier 24, data integrator 25 and data combiner 26 information indicating the regions in which a path is present and the regions in which a path is not present.

Finger unit 37 performs despreading on the basis of the path timings allocated by path allocator 32. Rake receiver 38 performs processing for rake combining of the signals that have been despread by finger unit 37, on the basis of instructions from path allocator 32.

Peak position detector 28 detects the position of peaks in the delay profile calculated by delay profile measuring unit 33, and also detects the correlation power at those peak positions, and stores these values in detected path table storage 30 as peak information.

On the basis of the peak information held in detected path table storage 30, region index calculator 29 decides, from the sum of the peak powers contained in each region into which the delay profile measurement range has been split, whether or not there is a valid path in that region. It then provides index information, which is information indicative of whether a region is a region in which a path is present, or whether it is a region in which a path is not present, and stores this index information in region index storage 31. On the basis of the index information held in region index storage 31, region designation calculator 27 outputs to data classifier 24, data integrator 25 and data combiner 26 information indicative of whether a given region is a region in which a path is present or is a region in which a path is not present.

On the basis of the peak information held in detected path table storage 30, path allocator 32 decides which path should be allocated to each finger of finger unit 37 so that maximum power will be obtained, and outputs this information to finger unit 37. Path allocator 32 also outputs, to rake receiver 38, information relating to finger unit 37 which is to perform the rake combining.

Next, the operation of the CDMA receiver according to this first embodiment of the invention will be described in detail with reference to the accompanying drawings.

Referring to FIG. 1, a received radio signal that has been input from antenna 21 is demodulated by radio-frequency receiving circuit 22, after which it undergoes analogue-to-digital conversion by A/D converter 23. The A/D converted digital data is then input to data classifier 24.

Figure 2A:
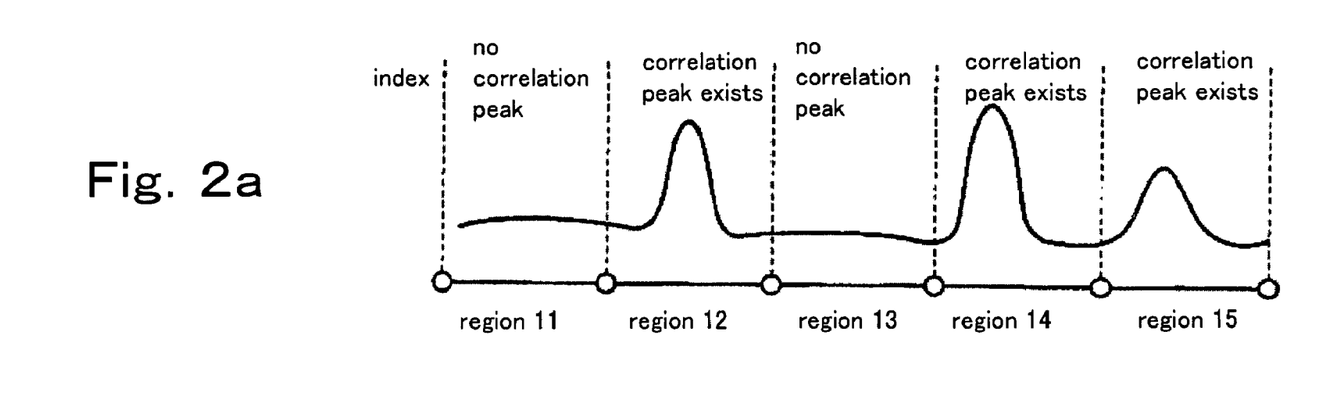
FIG. 2a shows a delay profile.

On the basis of instructions from region designation calculator 27, these instructions being based on the results of the previous path search, data classifier 24 performs processing for dividing the A/D converted digital data into regions in which a path was present and regions in which no path was present, by assigning indexes as shown in FIG. 2a. The data of regions in which no path was present is integrated by data integrator 25, and this integrated data is regarded as being the data of a single imaginary region with the same standard time length as the other regions. The data that has been integrated by data integrator 25 is input to delay profile measuring unit 33 after data combiner 26 has combined it by appending it to the end of the several regions in which a path was present.

Figure 2B:
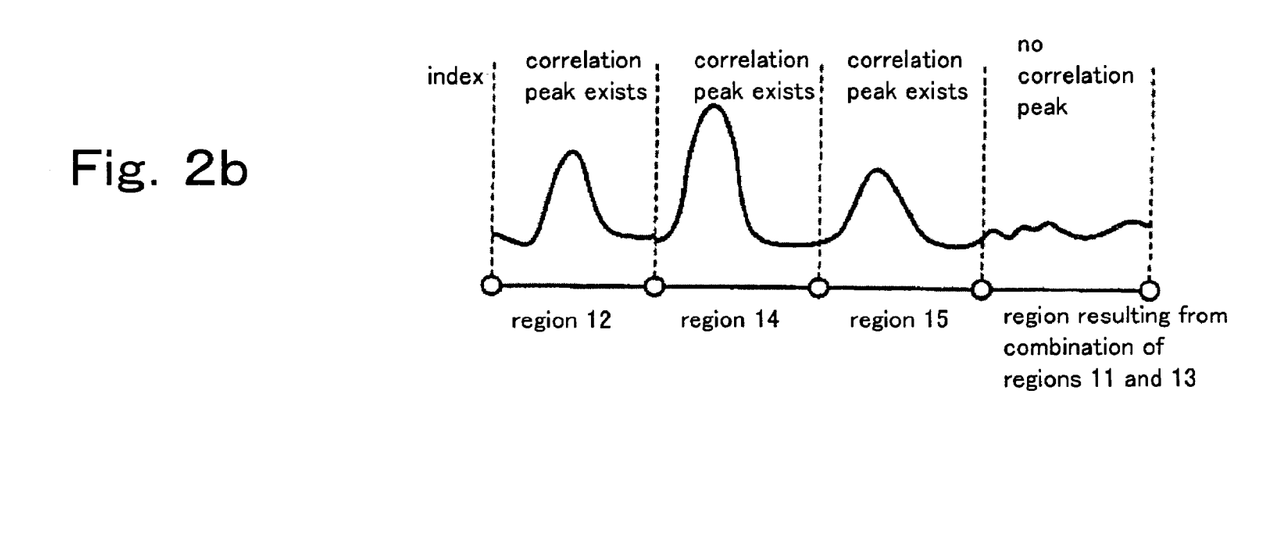
FIG. 2b shows a delay profile after combining.

On the assumption that the delay profile measured in the present sampling period is no more than slightly different from the previous delay profile, which is shown in FIG. 2a, then after the regions in which no path is present have been integrated and combined as described above, the present delay profile has the form shown in FIG. 2b.

In FIG. 2b, because region 11 and region 13 have been judged to be regions in which no path is present, the data of these regions has been integrated and appended to the other regions 12, 14 and 15.

Next, delay profile measuring unit 33 uses the data that has been input from data combiner 26 to calculate the delay profile. It does this by operating a correlator at time intervals that have been set as the delay resolution, thereby despreading the digital data and calculating correlation power as a function of delay.

On the basis of the results obtained for the position and power of the correlation peaks in the delay profile measured the previous time, data classifier 24 splits the digital data from A/D converter 23 into regions in which a path was present and regions in which a path was not present. FIG. 2a shows a delay profile obtained in the previous search. On the basis of this delay profile, region designation calculator 27 outputs indexes, and data classifier 24 divides the digital data from A/D converter 23 into data of regions in which a path is present and data of regions in which a path is not present.

Figure 3:
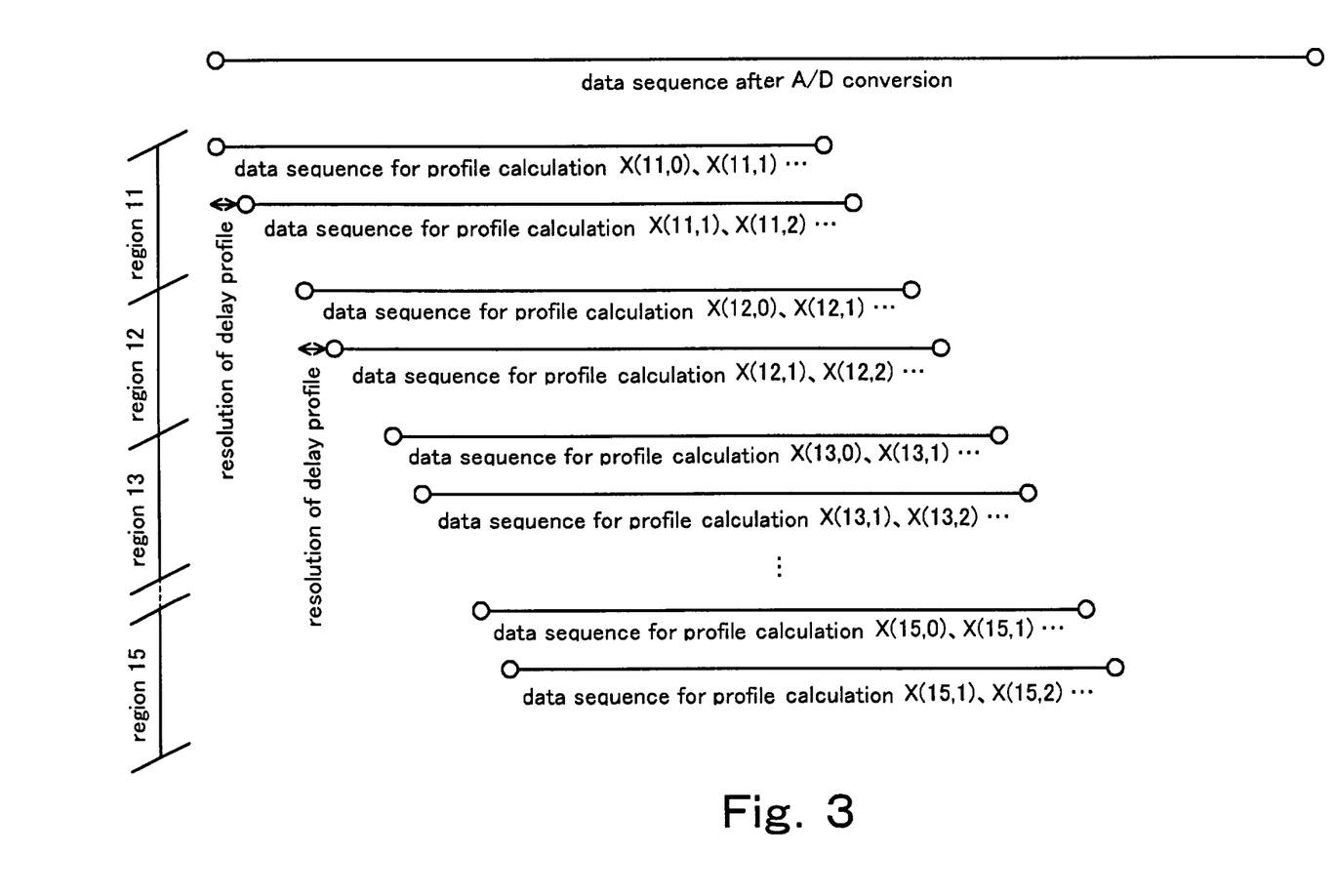
FIG. 3 shows data streams after analogue-to-digital conversion and prior to calculation of the delay profile.
Figure 4:
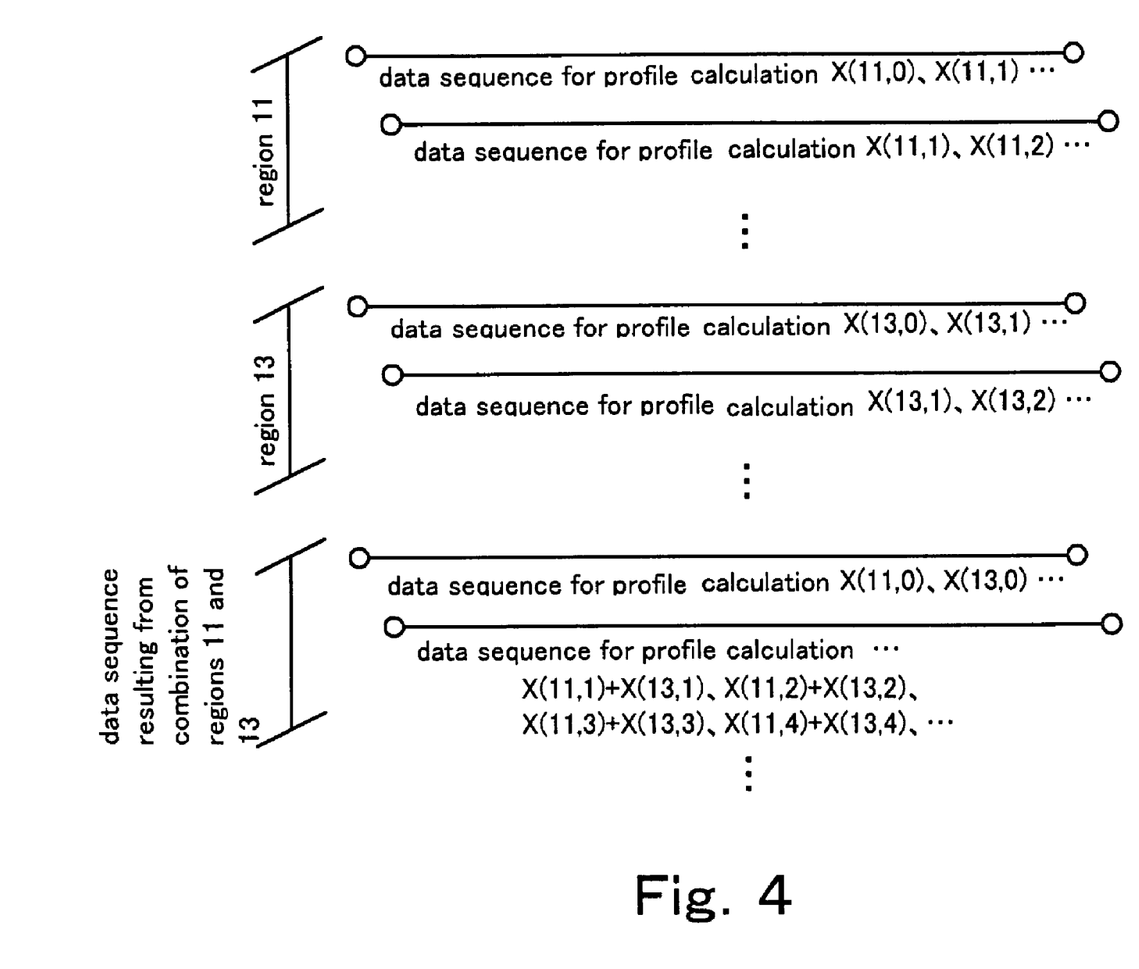
FIG. 4 shows data streams after analogue-to-digital conversion and after combining.

The topmost data sequence in FIG. 3 is the data that have been output from A/D converter 23 after analogue-to-digital conversion. Each sampling point for establishing the delay profile is obtained by despreading a "data sequence for profile calculation" (see FIG. 3), each such data sequence being a portion of the data sequence obtained by analogue-to-digital conversion. The following descriptions assume that the aggregations of data sequences shown as region 11 and region 13 in FIG. 3 correspond to regions in which there are no paths. In this case, as shown in FIG. 4, the data of region 11 and the data of region 13 are made into the data of a single imaginary region by being integrated by data integrator 25. Next, data combiner 26 combines the data integrated by data integrator 25 with the data of the regions in which a path was present, and outputs the combined data.

After data combination by data combiner 26, delay profile measuring unit 33 changes the combined data into a delay profile of the received signal. It calculates this delay profile by operating a correlator at time intervals that have been set as the delay resolution, thereby despreading the combined digital data and calculating correlation power as a function of delay. In this embodiment, because the data from data combiner 26 that corresponds to the plurality of regions in which no path is present has been integrated as the data of a single imaginary region, the amount of computation required by delay profile measuring unit 33 to calculate the delay profile is less than with a conventional CDMA receiver. In the examples of data shown in FIG. 2a and FIG. 2b, because the data of regions 11 and 13 are integrated, the amount of computation required for delay profile measuring unit 33 to calculate the delay profile can be reduced.

Next, the delay profile calculated by delay profile measuring unit 33 is input to path searcher 36. The delay profile input to path searcher 36 is first of all input to peak position detector 28.

Peak position detector 28 searches for the position and power of any correlation peaks. One method of searching for peaks is to take for example three consecutive points and to regard these as being a peak when the middle point has the highest value and this exceeds a certain threshold. The detected peak positions and powers are held in detected path table storage 30 in internal memory (RAM) 35.

Path allocator 32 looks up the data in detected path table storage 30, decides which paths to allocate to finger unit 37 so that maximum power will be obtained, and sends, to finger unit 37, information indicating which paths are allocated. Rake receiver 38 performs rake combining of the data that have been despread by the finger unit.

By likewise looking up detected path table storage 30, region index calculator 29 decides, from the sum of the peak powers contained in each region, whether or not a valid peak is present, and labels each region with index information indicative of whether it is a region which should not be integrated because a path is present, or whether it is a region which should be integrated because no peak is present. The index information given to each region is then held in region index storage 31.

A more detailed description will now be given of the operation, performed by region index calculator 29, of giving index information to each region.

Let N designate the total number of regions, and let Np designate the number of regions that have been given index information indicating that a peak is present. Assume also that regions without a correlation peak are rearranged by data combiner 26 in a final region. This means that regions which, as a result of the previous path search, were given index information indicating that a path is present, are gathered together as the first to the (Np)th region. The index information held in region index storage 31 for these regions up to and including the (Np)th region is only changed to index information indicating that no path is present if no significant correlation peak power is obtained in the present path search. It may be noted that an Np+1 value smaller than N indicates that the (Np+1)th region is a region obtained by integrating regions in which there are no paths. If a significant correlation peak power is obtained in this (Np+1)th region in the present path search, it is concluded that a path has come into existence in one of the regions in which previously no path had been present. In this case, the index information of all regions previously given index information indicating that no path is present, is changed to index information indicating a region in which a path is present. This operation is performed each time the path allocation for finger unit 37 is updated. It may be noted that in the examples shown in FIG. 2a and FIG. 2b, N=5 and Np=3.

Next, on the basis of the index information held in region index storage 31, region designation calculator 27 outputs, to data classifier 24, data integrator 25 and data combiner 26, information indicative of whether a given region is a region in which a path is present or is a region in which there is no path.

When a plurality of regions in which there is no path have been integrated and made into data of a single region in the manner of this embodiment, the data of this integrated region ends up having more noise components than the data prior to integration. Nevertheless, whether or not a path is present in the integrated region can be determined by measuring the delay profile. Confirmation of the presence of a path in the integrated region can be regarded as meaning that a path is present in one of the regions that were integrated, and therefore in the next processing cycle delay profile measurement is performed without integrating all the regions that had previously been integrated.

Because large-scale computation is generally required to calculate correlation power, the overall amount of computation and the power consumption can both be reduced by calculating the correlation power after integrating the regions in which there is no path or peak, as in the path search method employed in a CDMA receiver according to this first embodiment.

Figure 5:
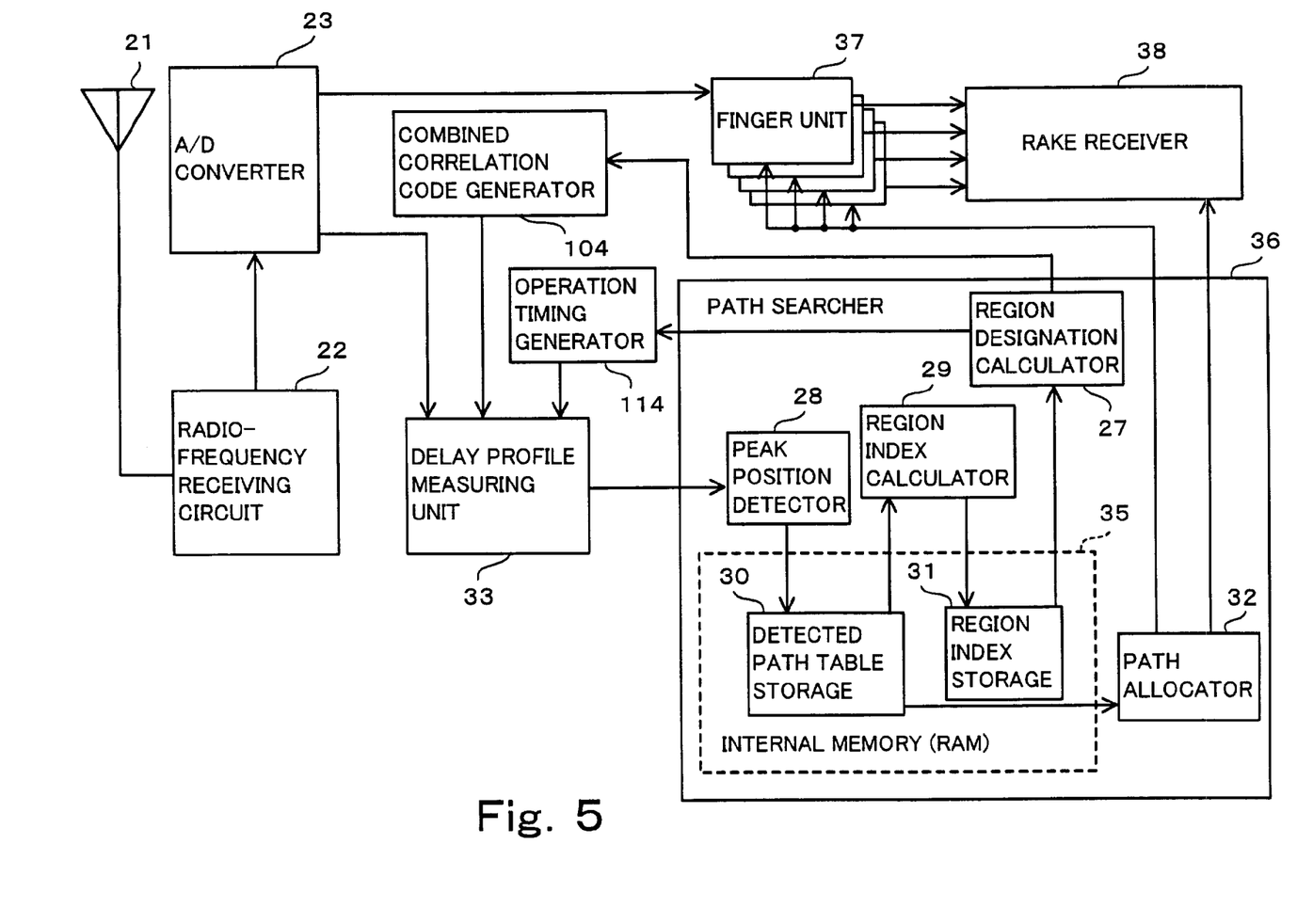
FIG. 5 is a block diagram showing the constitution of a CDMA receiver according to a second embodiment of the invention.

Next, a description will be given of a CDMA receiver according to a second embodiment of the present invention. The constitution of the CDMA receiver of this second embodiment is shown in FIG. 5, in which constituent elements that are identical to those appearing in FIG. 1 have the same referencing numbers. Descriptions of these identical elements will be omitted.

Unlike the CDMA receiver of the first embodiment, illustrated in FIG. 1, the CDMA receiver of this second embodiment does not integrate data of regions in which no peak is present. Instead, it is designed to obtain a similar value to that obtained by despreading after data integration, by despreading after combining spreading codes corresponding to regions in which there is no peak.

As shown in FIG. 5, a CDMA receiver according to this second embodiment has the following differences relative to the CDMA receiver of the first embodiment, illustrated in FIG. 1. Namely, operation timing generator 34 is replaced by operation timing generator 114, and combined correlation code generator 104 is provided instead of data classifier 24, data integrator 25 and data combiner 26. It may be mentioned that there is a block for generating correlation codes (spreading codes) in the CDMA receiver of the first embodiment as well, but this was not shown in FIG. 1.

Operation timing generator 114 has, in addition to the function of operation timing generator 34 in the CDMA receiver of the first embodiment (see FIG. 1), a function whereby, if the regions resulting from the previous delay profile measurement range being split contained a plurality of regions in which no path was present, it discontinues the correlation computation by delay profile measuring unit 33 in the second of those regions in which no path was present, and in subsequent such regions.

If the regions resulting from the delay profile measurement range being split contained a plurality of regions in which no path was present, combined correlation code generator 104 generates and outputs, for regions in which a correlation peak exists, a conventional correlation code, and for regions in which no correlation peak exists, a correlation code that has been combined on the basis of the delay differences among these plurality of regions in which a path is not present.

Figure 6:
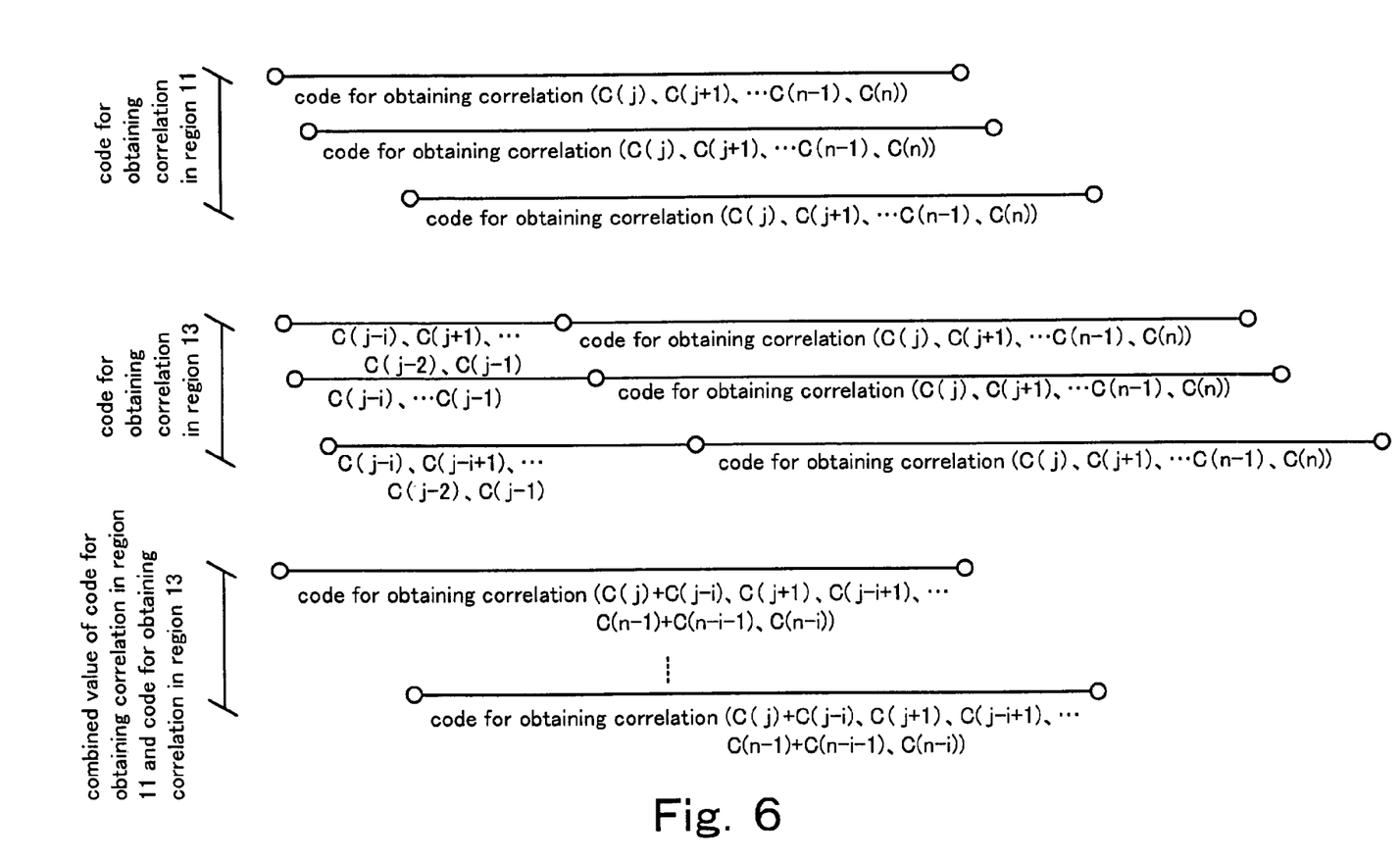
FIG. 6 serves to explain code sequences generated by the combined correlation code generator shown in FIG. 5.

FIG. 6 gives an example of correlation codes generated by combined correlation code generator 104 shown in FIG. 5. In the example given in FIG. 6, correlations would be calculated by taking the inner product of the data sequence and the code sequence $C(j), C(j+1), \ldots, C(n-1), C(n)$ for computing the correlation. Because this correlation code sequence is obtained by calculation, the value of data $C(j-1)$ prior to the code sequence for computing the correlation, and the value of subsequent data $C(n+1)$, can both be obtained by calculation. It is also possible to compute the correlation in any region using the same correlation code sequence. In this second embodiment, when region 11 and region 13 are to be combined, if a version of the correlation code that has been shifted by the delay difference between region 11 and region 13, i.e., a version of the correlation code shifted by delay difference i (see FIG. 6), is added to the original code sequence for computing the correlation, then as shown in FIG. 6, the combined correlation code sequence C(j)+C(j−i), C(j+1)+C(j−i+1), . . . , is obtained.

Using this combined code to perform correlation computation at the timings at which the correlation computation is carried out for region 11, results in correlation computation for region 13 being carried out as well. Thus, in this second embodiment, which is designed to perform the correlation computation after correlation codes have been combined, it is possible to obtain the same value as the correlation power obtained when the correlation computation was performed after integrating the data sequences of region 11 and region 13, but without having to rearrange the data after analogue-to-digital conversion and without having to integrate the data sequences. Furthermore, in this second embodiment of the invention, delay profile measuring unit 33 can discontinue the correlation computation under instruction from operation timing generator 114, at timings at which the correlation computation of the data of region 13 should normally be performed. Hence even when there are a plurality of regions in which a path is not present, the overall scale of the correlation computation and the power consumption can be reduced, because a single correlation computation is sufficient.

As in the case of the path search method based on the CDMA receiver of the first embodiment, the path search method based on the CDMA receiver of this second embodiment results in many noise components. Nevertheless, correlations can be obtained and whether or not a path is present can be determined by measuring the delay profile.

Next, the operation of the CDMA receiver according to this second embodiment of the invention will be described in detail with reference to the drawings.

In the following description as well, it is assumed that the topmost data sequence in FIG. 3 is the data after analogue-to-digital conversion. Each sampling point for establishing the delay profile is obtained by despreading and correlating a "data sequence for profile calculation" (see FIG. 3), each such data sequence being a portion of the data sequence obtained by analogue-to-digital conversion. The aggregations of data sequences shown as region 11 and region 13 in FIG. 3 correspond to regions in which there are no paths.

Up to the output of digital data by A/D converter 23, the operation of the CDMA receiver in this second embodiment is identical to that of the first embodiment illustrated in FIG. 1, and hence need not be described. However, in this second embodiment, digital data output from A/D converter 23 are input to delay profile measuring unit 33.

On the basis of measurements of the correlation peaks in the previous delay profile data, correlation code generator 104 generates combined correlation codes for regions in which a path is not present, in the manner shown in FIG. 6. By using the correlation codes generated by correlation code generator 104 when calculating correlation power for the data of region 11, delay profile measuring unit 33 can calculate the correlation power in region 13 as well, at the same time as it calculates the correlation power in region 11 in order to measure the delay profile of region 11. As a result, processing for calculating the correlation power in region 13 can be omitted. Hence in this second embodiment of the invention, the amount of computation required for calculating correlation power is reduced, not by integrating the data of regions in which there is no path, but instead by combining, on the basis of their delays, the correlation codes for calculating the correlation power of the data in regions in which there is no path.

It may be noted that although in the first and second embodiments of the invention, in order to simplify the description, delay profile measuring unit 33 was described as comprising a single correlator, in a practical configuration, in order to speed up the operation, a plurality of correlators would be provided and measurements of a plurality of delay profiles would be performed in parallel.

Furthermore, although in the first and second embodiments of the invention the calculation etc. of delay profile was performed without storing the digital data after analogue-to-digital conversion, an alternative method may be contemplated. Namely, the A/D converted data can be temporarily stored and, if there is a region in which there was previously no peak but in which a peak is now present, the delay profile is calculated without integrating this region in which there was previously no peak, thereby obtaining the position of the peak. If such a method is employed, the approximate location of the peak in each region is known when measuring the delay profile after integrating the regions in which there is no peak, and hence, provided that the delay profile calculation and the peak search are confined to this vicinity, the delay profile can be calculated with only a small amount of computation.

Figure 7:
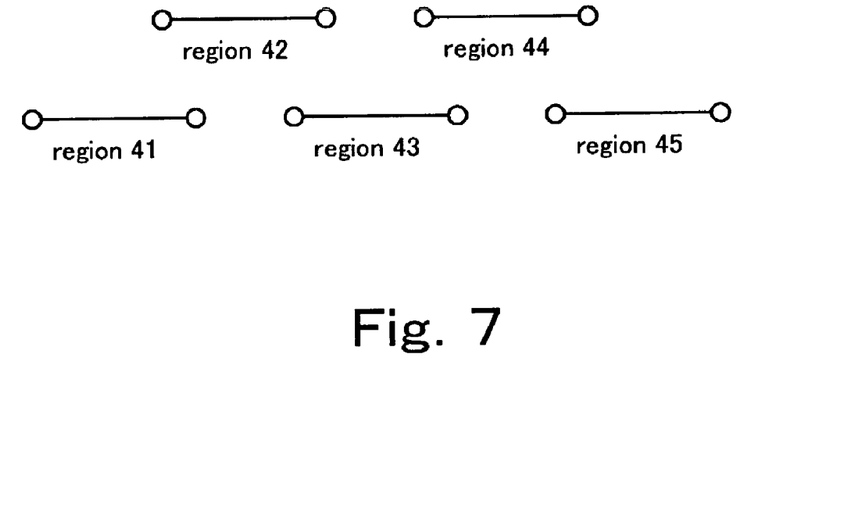
FIG. 7 shows an example of how the delay profile measurement range can be split into regions.
Figure 8:
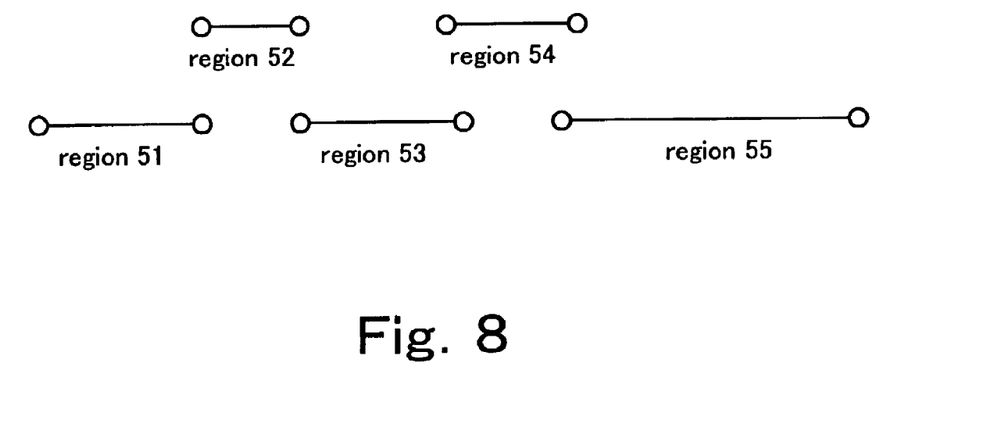
FIG. 8 shows another example of how the delay profile measurement range can be split into regions.

Moreover, although the first and second embodiments were described using an example in which the delay profile measurement range is split into five regions, this invention is not thereby restricted to this example, and the number of regions into which the delay profile measurement range is split can be more than five or fewer than five. The delay profile measurement range can alternatively be split into overlapping regions, as shown by regions 41 to 45 in FIG. 7. Alternatively, as illustrated by regions 51 to 55 in FIG. 8, the regions into which it is split do not all have to be of the same length. It is also feasible to control the length of each split region in accordance with the distribution of detected path positions.

Although not illustrated in the drawings, the CDMA receivers according to the first and second embodiments of this invention are provided with a recording medium on which has been recorded a program for implementing the path search method described above. This recording medium can be a magnetic disc, a semiconductor memory, etc. The program is read into the CDMA receiver from the recording medium, whereupon it controls the operation of the CDMA receiver. Namely, the processing described in preceding paragraphs is implemented by the CPU of the CDMA receiver, under control of the program, instructing the hardware resources of the CDMA receiver to perform specific processes.

As has been described above, this invention provides the following benefit. Namely, it enables a reduction to be made in the amount of calculation and power consumption required for the path search processing that finds valid paths from a delay profile that has been obtained. The invention obtains this benefit by calculating the delay profile after combining, in a single imaginary region, regions in which there was no path when the data in the delay profile measurement range was measured in the previous sampling period.

What is claimed is:

1. A CDMA receiver that periodically performs a path search on A/D converted digital data after forming a delay profile by calculating correlation power at each of a plurality of delays; said CDMA receiver comprising:
    path search means for performing a path search on the basis of the previously calculated delay profile, splitting the delay profile measurement range into a plurality of regions, and discriminating between regions in which a path is present and regions in which a path is not present;

data classifying means for classifying said A/D converted digital data into data of regions in which a path is present and data of regions in which a path is not present, on the basis of information from said path search means;

a data integrator for integrating the data of the plurality of regions that have been classified by said data classifying means as regions in which a path is not present, whereby the integrated data is regarded as the data of a single imaginary region;

data combining means for combining the region data that has been integrated by said data integrator, with the data of regions that have been classified by said data classifying means as regions in which a path is present; and delay profile measuring means for creating a delay profile for the data after it has been combined by said data combining means, by calculating the correlation power at each of a plurality of delays.

2. The CDMA receiver of claim 1, wherein said path search means comprises:

peak position detection means for detecting the peak positions in the delay profile calculated by said delay profile measuring means, and for detecting the correlation power at said peak positions;

region index calculating means for deciding, on the basis of the peak information detected by said peak position detection means, and from the sum of the peak powers contained in each region resulting from splitting the delay profile measurement range, whether each said region is a region in which a peak is present, or is a region in which a peak is not present; and for calculating index information indicative of the result of said decision; and region designation calculating means for outputting, on the basis of the index information obtained by said region index calculating means, information indicative of whether a given region is a region in which a path is present, or whether it is a region in which a path is not present.

3. A CDMA receiver that periodically performs a path search on A/D converted digital data after forming a delay profile by calculating correlation power at each of a plurality of delays; said CDMA receiver comprising:

path search means for performing a path search on the basis of the previously calculated delay profile, splitting the delay profile measurement range into a plurality of regions, and discriminating between regions in which a path is present and regions in which a path is not present;

combined correlation code generation means for generating and outputting, for regions in which a path is present, a conventional correlation code, and for generating and outputting, for regions in which a path is not present, a correlation code that has been combined on the basis of the delay differences among these plurality of regions in which a path is not present;

delay profile measuring means for creating a delay profile for said A/D converted digital data by calculating the correlation power at each of a plurality of delays, using the correlation codes generated by said combined correlation code generation means; and operation timing generation means which, if there were, in the previously calculated delay profile and among the regions resulting from splitting the delay profile measurement range, a plurality of regions in which a path was not present, discontinues the correlation calculation of the delay profile measuring means in regions other than a region selected from among the plurality of regions in which a path was not present.

4. The CDMA receiver of claim 3, wherein said path search means comprises:

peak position detection means for detecting the peak positions in the delay profile calculated by said delay profile measuring means, and for detecting the correlation power at said peak positions;

region index calculating means for deciding, on the basis of the peak information detected by said peak position detection means, and from the sum of the peak powers contained in each region resulting from splitting the delay profile measurement range, whether each said region is a region in which a peak is present, or is a region in which a peak is not present; and for calculating index information indicative of the result of said decision; and region designation calculating means for outputting, on the basis of the index information obtained by said region index calculating means, information indicative of whether a given region is a region in which a path is present, or whether it is a region in which a path is not present.

5. A path search method of periodically performing path search on A/D converted digital data after forming a delay profile by calculating correlation power at each of a plurality of delays; said path search method comprising steps of:

performing a path search on the basis of the previously calculated delay profile, splitting the delay profile measurement range into a plurality of regions, and discriminating between regions in which a path is present and regions in which a path is not present;

classifying said A/D converted digital data into data of regions in which a path is present and data of regions in which a path is not present, on the basis of information indicative of whether the region in question is a region in which a path is present, or is a region in which a path is not present;

integrating the data of the plurality of regions that have been classified as regions in which a path is not present, whereby the integrated data is regarded as the data of a single imaginary region;

combining the data obtained by integrating the data of the plurality of regions in which a path is not present, with the data of regions that have been classified as regions in which a path is present; and creating a delay profile for said data after it has been combined, by calculating the correlation power at each of a plurality of delays.

6. A path search method of periodically performing path search on A/D converted digital data after forming a delay profile by calculating correlation power at each of a plurality of delays; said path search method comprising steps of:

performing a path search on the basis of the previously calculated delay profile, splitting the delay profile measurement range into a plurality of regions, and discriminating between regions in which a path is present and regions in which a path is not present;

generating and outputting, for regions in which a path is present, a conventional correlation code, and generating and outputting, for regions in which a path is not present, a correlation code that has been combined on the basis of the delay differences among these plurality of regions in which a path is not present;

if there were, in the previously calculated delay profile and among the regions resulting from splitting the delay profile measurement range, a plurality of regions in which a path was not present, discontinuing the correlation calculation in regions other than a region selected from among the plurality of regions in which a path was not present; and, in regions in which a path is present and in a region selected from among the plurality of regions in which a path is not present, creating a delay profile for said A/D converted digital data by calculating the correlation power at each of a plurality of delays, using said generated correlation codes.

7. A computer program encoded on a computer readable medium for causing a computer to execute a path search method of periodically performing path search on A/D converted digital data after forming a delay profile by calculating correlation power at each of a plurality of delays; said program serving to cause a computer to execute processes of:

performing a path search on the basis of the previously calculated delay profile, splitting the delay profile measurement range into a plurality of regions, and discriminating between regions in which a path is present and regions in which a path is not present;

classifying said A/D converted digital data into data of regions in which a path is present and data of regions in which a path is not present, on the basis of information indicative of whether the region in question is a region in which a path is present, or is a region in which a path is not present;

integrating the data of the plurality of regions that have been classified as regions in which a path is not present, whereby the integrated data is regarded as the data of a single imaginary region;

combining the data obtained by integrating the data of the plurality of regions in which a path is not present, with the data of regions that have been classified as regions in which a path is present; and creating a delay profile for said data after it has been combined, by calculating the correlation power at each of a plurality of delays.

8. A computer program encoded on a computer readable medium for causing a computer to execute a path search method of periodically performing path search on A/D converted digital data after forming a delay profile by calculating correlation power at each of a plurality of delays; said program serving to cause a computer to execute processes of:

performing a path search on the basis of the previously calculated delay profile, splitting the delay profile measurement range into a plurality of regions, and discriminating between regions in which a path is present and regions in which a path is not present;

generating and outputting, for regions in which a path is present, a conventional correlation code, and generating and outputting, for regions in which a path is not present, a correlation code that has been combined on the basis of the delay differences among these plurality of regions in which a path is not present;

if there were, in the previously calculated delay profile and among the regions resulting from splitting the delay profile measurement range, a plurality of regions in which a path was not present, discontinuing the correlation calculation in regions other than a region selected from among the plurality of regions in which a path was not present; and, in regions in which a path is present and in a region selected from among the plurality of regions in which a path is not present, creating a delay profile for said A/D converted digital data by calculating the correlation power at each of a plurality of delays, using said generated correlation codes.

* * * * *